US010026002B2

(12) United States Patent
Inoshita

(10) Patent No.: US 10,026,002 B2
(45) Date of Patent: Jul. 17, 2018

(54) OBJECT DETECTION APPARATUS, METHOD FOR DETECTING OBJECT, AND LEARNING APPARATUS

(71) Applicant: NEC Corporation, Minato-ku, Tokyo (JP)

(72) Inventor: Tetsuo Inoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 158 days.

(21) Appl. No.: 15/025,337

(22) PCT Filed: Aug. 21, 2014

(86) PCT No.: PCT/JP2014/004284
§ 371 (c)(1),
(2) Date: Mar. 28, 2016

(87) PCT Pub. No.: WO2015/049826
PCT Pub. Date: Apr. 9, 2015

(65) Prior Publication Data
US 2016/0232418 A1  Aug. 11, 2016

(30) Foreign Application Priority Data
Oct. 1, 2013 (JP) ................................. 2013-206046

(51) Int. Cl.
*G06K 9/00* (2006.01)
*G06K 9/32* (2006.01)
(Continued)

(52) U.S. Cl.
CPC ......... *G06K 9/3233* (2013.01); *G06K 9/4604* (2013.01); *G06K 9/4642* (2013.01);
(Continued)

(58) Field of Classification Search
CPC ..... G06K 2209/21; G06T 7/246; G06T 7/248; G08B 13/19615
See application file for complete search history.

(56) References Cited

U.S. PATENT DOCUMENTS 8,131,011 B2 *   3/2012  Nevatia .............. G06K 9/00369
382/103
8,311,291 B2 *  11/2012  Yonezawa .......... G06K 9/00248
382/103

(Continued)

FOREIGN PATENT DOCUMENTS

JP    2004-054442 A    2/2004
JP    2007-034723 A    2/2007
WO    2013/008302 A1   1/2013

OTHER PUBLICATIONS

Schneiderman et al ("Probablistic Modeling of Local Appearance and Spatial Relationships for Object Recognition", 1998).*

(Continued)

*Primary Examiner* — Avinash Yentrapati

(57) ABSTRACT

An object detection apparatus, etc., capable of detecting an object area with greater precision is disclosed. Such an object detection apparatus is provided with: a part area indication means for indicating a part area which is an area including a target part among parts forming an object including an detection-target object, from a plurality of images including the object; an appearance probability distribution generation means for generating an appearance probability distribution and the absence probability distribution of the part area based on the appearance frequency of the part area associated with each position in the images; and an object determination means for determining, in an input image, the area including the object, with reference to the appearance probability distribution and the absence probability distribution of the part area.

16 Claims, 14 Drawing Sheets

(51) Int. Cl.
*G06K 9/46* (2006.01)
*G06K 9/62* (2006.01)
*G06K 9/66* (2006.01)

(52) U.S. Cl.
CPC ......... *G06K 9/4661* (2013.01); *G06K 9/6212* (2013.01); *G06K 9/66* (2013.01); *G06T 2207/10016* (2013.01); *G06T 2207/20072* (2013.01); *G06T 2207/20076* (2013.01); *G06T 2207/20081* (2013.01)

(56) References Cited

U.S. PATENT DOCUMENTS

| | | | | |
|---|---|---|---|---|
| 8,913,783 B2* | 12/2014 | Khan | ................ | G06K 9/00651 382/103 |
| 2005/0129275 A1* | 6/2005 | Porter | ................ | G06K 9/00228 382/103 |
| 2009/0041357 A1* | 2/2009 | Yonezawa | .......... | G06K 9/00248 382/195 |
| 2009/0245579 A1* | 10/2009 | Hu | ........................ | G03B 13/00 382/103 |
| 2012/0045095 A1* | 2/2012 | Tate | ........................ | G06T 5/003 382/103 |
| 2012/0057748 A1* | 3/2012 | Katano | ................... | G06T 7/204 382/103 |
| 2012/0213411 A1* | 8/2012 | Nozaki | ................... | H04N 5/235 382/103 |
| 2012/0230583 A1* | 9/2012 | Inoshita | ............... | G06K 9/3233 382/165 |
| 2013/0230211 A1* | 9/2013 | Tanabiki | ............ | G06K 9/00342 382/103 |
| 2013/0243259 A1* | 9/2013 | Kawaguchi | ........ | G06K 9/00369 382/103 |
| 2013/0301882 A1* | 11/2013 | Kawaguchi | ........ | G06K 9/00335 382/103 |
| 2014/0015998 A1* | 1/2014 | Inoshita | ................. | H04N 5/232 348/222.1 |
| 2014/0133705 A1* | 5/2014 | Hanita | ............... | G06K 9/00845 382/103 |

OTHER PUBLICATIONS

T. Mitsui, H. Fujiyoshi, "Part-based Person Detection Method Using Randomized Trees" (2011), Dynamic Image processing for real Application workshop 2011 (DIA), No. O3-1.

R. Fergus, P. Persona, A. Zisserman, "Object Class Recognition by Unsupervised Scale-Invariant Learning" (2003), In CVPR, English Abstract.

International Search Report for PCT Application No. PCT/JP2014/004284, dated Nov. 18, 2014.

English translation of Written opinion for PCT Application No. PCT/JP2014/004284.

* cited by examiner

OBJECT DETECTION APPARATUS, METHOD FOR DETECTING OBJECT, AND LEARNING APPARATUS

This application is a National Stage Entry of PCT/JP2014/004284 filed on Aug. 21, 2014, which claims priority from Japanese Patent Application 2013-206046 filed on Oct. 1, 2013, the contents of all of which are incorporated herein by reference, in their entirety.

TECHNICAL FIELD

The present invention relates to an object detection apparatus and a method for detecting an object in an image.

BACKGROUND ART

A technique for detecting an object from a video (or a still image) is called object detection. Object detection is used for the purpose of finding a desired object, which is a monitoring target, from a moving image captured by a camera, for the purpose of focusing on a particular object to increase image quality, and the like.

As an aspect of object detection, a technique called a sliding window approach is used. A concept of a process in the sliding window approach is illustrated in FIG. 15. As illustrated in FIG. 15, the sliding window approach sets a rectangular area (window) on a detection-target image. While changing a position and a size of the window, the sliding window approach evaluates whether or not a detection-target object exists in each rectangular area, by use of an evaluation function. However, this approach has a problem that it is difficult to accurately determine a position of the detection target when the detection-target object is partially hidden by another object, or when the window size is largely different from a size of the detection target.

Meanwhile, NPL 1 proposes a technique for detecting a person by use of an ensemble learning approach structured by a set of a plurality of decision trees. In this technique, decision trees are structured by a group of images each including a local position of an object, which is called a part, and score-based evaluation is made for each input image as to which part the input image is classified to. It has been reported that there is a case that, even when an object is partially hidden, the part may be highly likely detected on the basis of areas that are not hidden, since each part represents a local area. In NPL 1, a person is detected by use of an average value of scores calculated from results of recognition of a plurality of parts (FIG. 16).

NPL 2 proposes a constellation model, in which a relationship between parts is modeled as constellations. The constellation model represents a probability distribution which indicates, for each part, what kind of parameters such as appearance, relative position, rotation angle, and size make the part exist in a two-dimensional image. In NPL 2, a model based on an average value of a variance of positions and sizes of parts is generated. A likelihood for each of all combinations of part candidates, that the combination matches any constellation model is calculated. The likelihood of the combination being a background is also calculated. Then, in this method, whether the target is an object or not is determined on the basis of whether or not the ratio between the two likelihoods is higher than or equal to a threshold value.

CITATION LIST

Non-Patent Literature

NPL 1: T. Mitsui, H. Fujiyoshi, "Part-based Peron Detection Method Using Randomized Trees" (2011), Dynamic Image processing for real Application workshop 2011 (DIA), No. 03-1

NPL 2: R. Fergus, P. Persona, A. Zisserman, "Object class recognition by unsupervised scale-invariant learning" (2003), In CVPR

SUMMARY OF INVENTION

Technical Problem

However, the above-described techniques have a problem that neither of the techniques is able to accurately detect an area which includes the object (an object area). For example, in the technique of NPL 1, an image including a human body is divided into the plurality of part areas, and determination is made as to whether or not a human body is detected, on the basis of an average value of scores calculated for the respective part areas. However, this technique does not take into account positional relationship between the part areas. For this reason, even when positions of the part areas are incorrect as illustrated in FIG. 17, the object may be detected as a human body. This may lead to false detection.

The technique of NPL 2 performs evaluation on the basis of positional relationship between modeled part areas. However, in the technique of NPL 2, the part areas are modeled only on the basis of the total value of appearance probability distributions of the part areas. Accordingly, no adjustment is made for an area whose appearance probability is zero. For this reason, an area larger than an actual object area may be detected in some cases, consequently decreasing accuracy of position.

The present invention has been made in view of the above-described problems and aims to provide an object detection apparatus, a method for detecting an object, and a learning apparatus that are capable of accurately detecting an object area.

Solution to Problem

An object detection apparatus according to one aspect of the present invention includes: part area indication means for indicating a part area which is an area including a target part from parts forming a detection-target object, from a plurality of images including the object;

appearance probability distribution generation means for generating an appearance probability distribution and an absence probability distribution of the part area based on an appearance frequency of the part area associated with each position in the images; and object determination means for determining an area including the object in an input image with reference to the appearance probability distribution and the absence probability distribution of the part area.

A method for detecting an object according to another aspect of the present invention includes: indicating a part area which is an area including a target part from parts forming a detection-target object, from a plurality of images including the object;

generating an appearance probability distribution and an absence probability distribution of the part area based on an appearance frequency of the part area associated with each position in the images; and determining an area including the object in an input image with reference to the appearance probability distribution and the absence probability distribution of the part area.

A learning apparatus according to another aspect of the present invention includes: part area indication means for indicating a part area which is an area including a target part from parts forming a detection-target object, from a plurality of images including the object; and appearance probability distribution generation means for generating an appearance probability distribution and an absence probability distribution of the part area based on an appearance frequency of the part area associated with each position in the images.

In addition, the aim is also achieved by a computer program that achieves the object detection apparatus, the method for detecting the object, or the learning apparatus having each of the above-described configurations with a computer, and a computer-readable recording medium that stores the computer program.

Advantageous Effects of Invention

According to the present invention, it is possible to accurately detect an object area.

DESCRIPTION OF EMBODIMENTS

Exemplary embodiments of the present invention are described below.

First Exemplary Embodiment

Figure 1:
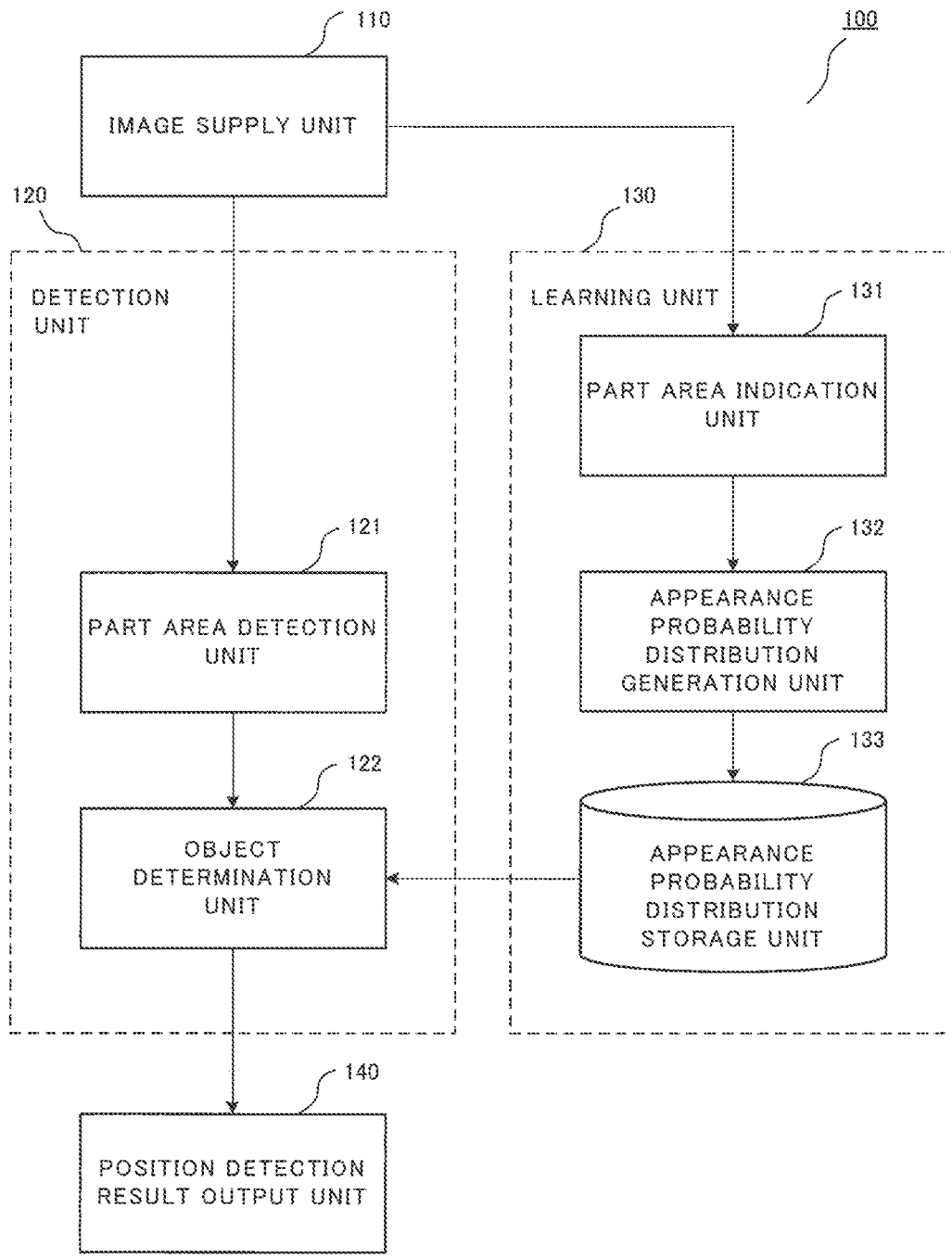
FIG. 1 is a block diagram illustrating a configuration of an object detection apparatus according to a first exemplary embodiment of the present invention.

FIG. 1 is a block diagram illustrating a configuration of an object detection apparatus according to the exemplary embodiment of the present invention. An object detection apparatus 100 includes an image supply unit 110, a detection unit 120, a learning unit 130, and a position detection result output unit 140.

The detection unit 120 includes a part area detection unit 121 and an object determination unit 122. The learning unit 130 includes a part area indication unit 131, an appearance probability distribution generation unit 132, and an appearance probability distribution storage unit 133. The position detection result output unit 140 outputs a detection result obtained by the detection unit 120.

The object detection apparatus 100 may be any image processing apparatus and may be, for example, a general-purpose computer apparatus or an image capturing apparatus (such as a mobile phone, a smartphone, or a digital still camera).

An overview of each of the components is described.

The image supply unit 110 acquires an image captured by any image capturing means. The image supply unit 110 supplies the image to the part area indication unit 131 when learning, and supplies the image to the part area detection unit 121 when detecting. The image supply unit 110 may have any configuration as long as it can supply a processing-target image. For example, the image supply unit 110 may read an image from a storage device removable from the object detection apparatus 100 (for example, a universal serial bus (USB) memory) and may supply the image to the detection unit 120 or the learning unit 130. The image supplied by the image supply unit 110 is assumed to be a still image in this exemplary embodiment. The image supply unit 110 may also divide a video into frames each of which configures the video and sequentially supply the frames to the detection unit 120 or the learning unit 130.

The learning unit 130 includes the part area indication unit 131 which indicates part areas, the appearance probability distribution generation unit 132 which generates the appearance probability distribution of each part area, and the appearance probability distribution storage unit 133. The learning unit 130 may be removable from the object detection apparatus 100.

The part area indication unit 131 indicates each part area of an object included in an image and passes the coordinate values indicating the part area to the appearance probability distribution generation unit 132. The part area may be indicated manually or may be indicated by use of a known part area detection technique to be described later. Here, the part area is an area in an image including an object, which includes a part forming the object.

The appearance probability distribution generation unit 132 generates an appearance frequency histogram by counting, for each position of a plurality of part areas input by the part area indication unit 131, the appearance frequency. The appearance probability distribution generation unit 132 generates an appearance probability distribution and an absence probability distribution for each of the part areas forming the object, on the basis of the generated appearance frequency histograms.

Figure 4:
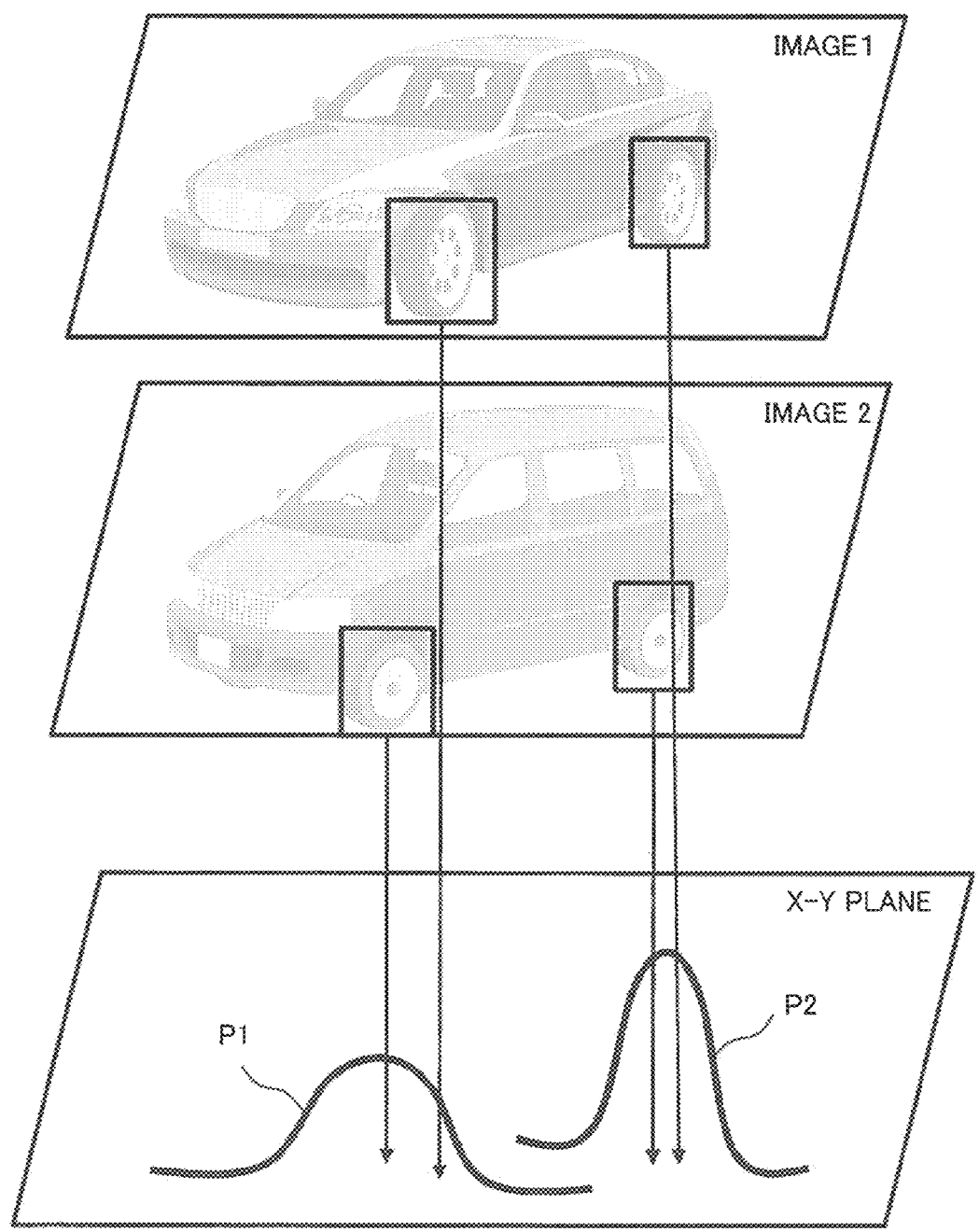
FIG. 4 is a diagram illustrating generation of appearance frequency distributions.

For example, the appearance probability distribution generation unit 132 converts the position and the size of each tire area in the image to the position and the size in an X-Y plane (illustrated in FIG. 4). The appearance probability distribution generation unit 132 performs this conversion on a number of images and consequently obtains the appearance frequency of the tire area at the position in the z-axis direction. In this way, the appearance probability distribution generation unit 132 calculates the appearance frequency of the tire area in association with the position of the tire area in the image. The appearance probability distribution generation unit 132 may obtain the appearance probability of the tire area by obtaining the total of all the appearance frequencies of the tire area in the X-Y plane obtained through conversion and dividing the appearance frequency of the tire area at each position by the total. The appearance probability distribution generation unit 132 may obtain a local maximum value of the appearance frequencies and may fit the spread from the position of the local maximum value to a certain appearance frequency value, to Gaussian distribution as the variance of the distribution. For example, the absence probability distribution of a tire is equal to an appearance probability distribution generated when the appearance frequencies of the parts other than the tire are calculated.

The appearance probability distribution storage unit 133 stores the appearance probability distributions and the absence probability distributions generated in advance by the appearance probability distribution generation unit 132 on the basis of a number of images. The appearance probability distribution storage unit 133 may retain the values of each distribution in a file format or in a format such as a database table. The appearance probability distribution storage unit 133 may store an appearance probability distribution with respect to the position of each part area of a plurality of kinds of objects. For example, the appearance probability distribution storage unit 133 may store an appearance probability distribution with respect to the position of each part area of each of the object kinds including large-sized cars, medium-sized cars, small-sized cars, scooters, off-road motorcycles, and naked motorcycles. In this case, the part area means an area including a functional-unit part, such as a tire or a headlight.

The part area detection unit 121 divides an image supplied by the image supply unit 110 into partial areas and represents each partial area with an evaluation value (score) indicating the likelihood of being a certain part area. The part area detection unit 121 generates a score map storing the scores of the respective partial areas in the image.

The object determination unit 122 determines, for a certain area of the image supplied by the image supply unit 110, whether or not a detection-target object is included in the area. The object determination unit 122 calculates the evaluation value on the basis of a score of a part area calculated by the part area detection unit 121 and the appearance probability distribution of the part area stored in the appearance probability distribution storage unit 133. The object determination unit 122 may sum the evaluation values of a plurality of part areas and determine whether the target object is detected based on a threshold value.

Figure 2:
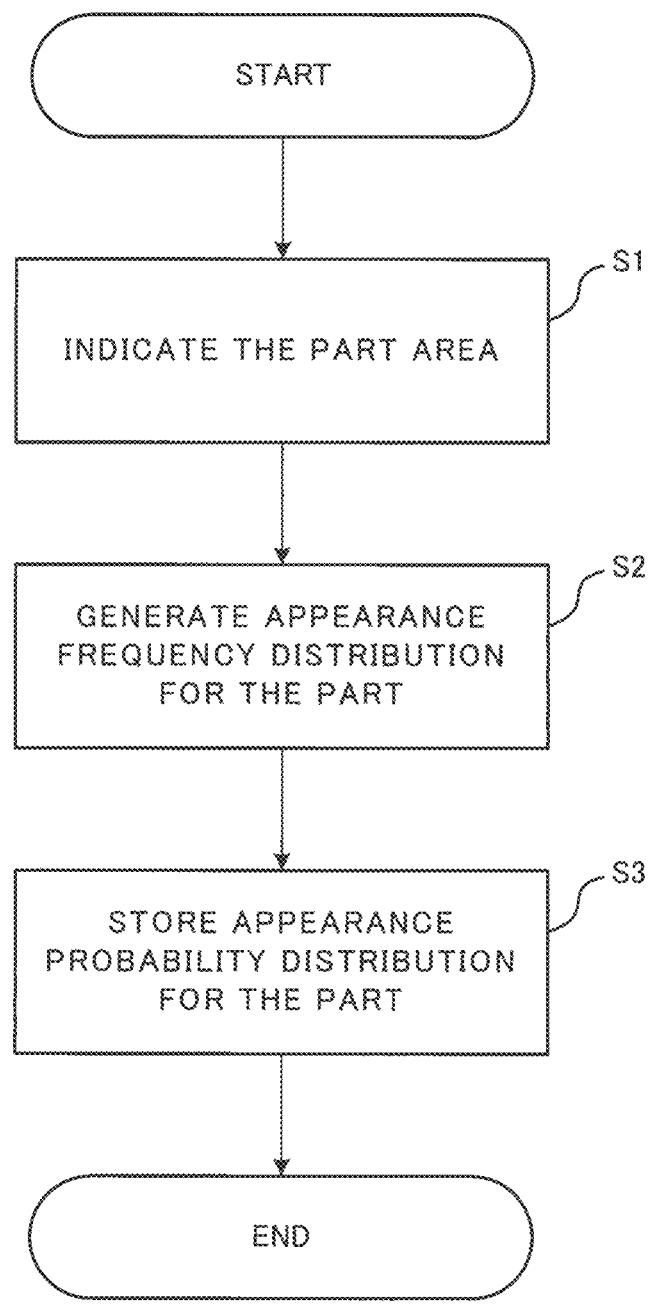
FIG. 2 is a flowchart illustrating a procedure of object detection.
Figure 3:
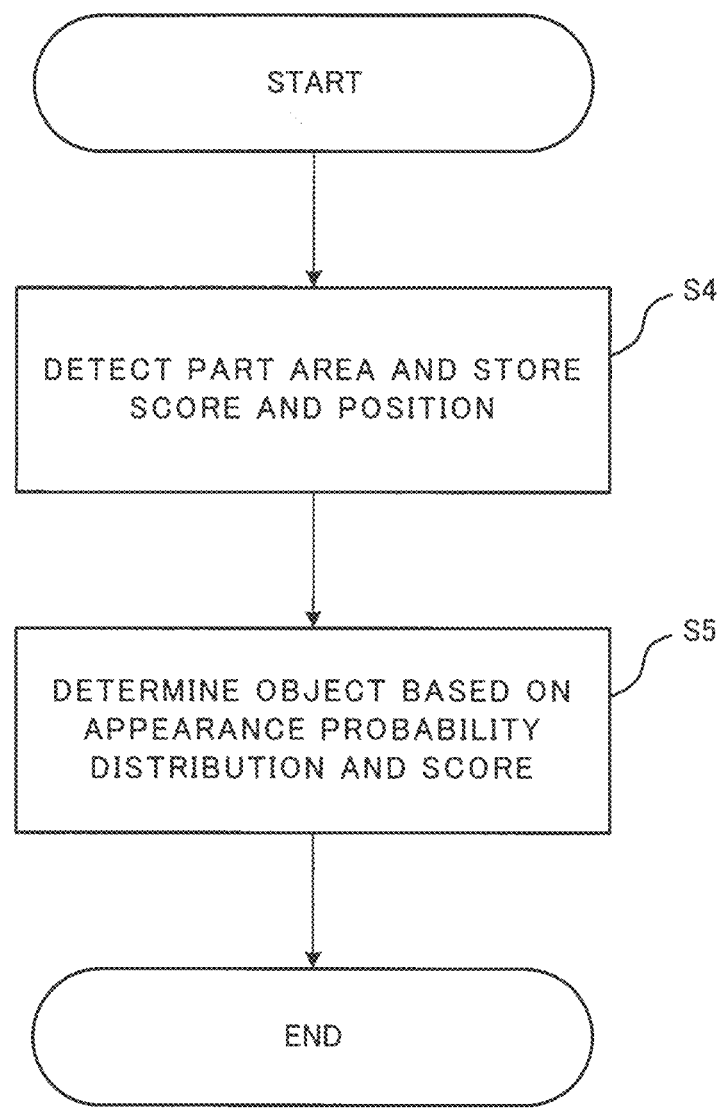
FIG. 3 is a flowchart illustrating the procedure of object detection.

FIG. 2 and FIG. 3 are flowcharts illustrating a procedure of object detection by the object detection apparatus 100.

An overview of a procedure carried out by the object detection apparatus 100 is described with reference to FIG. 1 to FIG. 3.

First, operation for learning is described.

The image supply unit 110 supplies a plurality of images (object images) which includes a detection-target object, to the part area indication unit 131 of the learning unit 130 in advance.

The part area indication unit 131 indicates the position and the size of each part area from each input image (S1). The appearance probability distribution generation unit 132 calculates, for each position in images, the frequency of the part area appears, on the basis of the position and the size of the part area, and generates the result as a distribution of the result (S2). Here, the position of the part area may be either an absolute position or a relative position. The part area indication unit 131 generates, for each part area, an appearance probability distribution and an absence probability distribution on the basis of the appearance frequency distribution generated for the part area. The part area indication unit 131 also stores the appearance probability distribution and the absence probability distribution in the appearance probability distribution storage unit 133 (S3).

Next, operation for detection is described.

The image supply unit 110 supplies a detection-target image to the part area detection unit 121 of the detection unit 120.

The part area detection unit 121 performs detection of a part area in each of partial areas obtained by dividing the detection-target image and stores, for each partial area, a score indicating the likelihood of being the part area together with the position of the part area (S4).

The object determination unit 122 determines whether a target object is detected, on the basis of: the appearance probability distributions and the absence probability distributions stored in the appearance probability distribution storage unit 133; and the scores indicating the likelihood of being the corresponding part area, each of which are calculated by the part area detection unit 121. The object determination unit 122 may employ a determination method of, for example, multiplying the scores of the respective partial areas corresponding to each of the part areas by the corresponding appearance probability distribution or the absence probability distribution, assuming that each appearance probability distribution is represented by positive values whereas each absence probability distribution is represented by negative values. Then, the object determination unit 122 obtains the evaluation value by calculating the total of the multiplied values for a certain area and determines that the object is detected when the evaluation value is larger than or equal to the threshold value (S5).

Next, detailed operation of the object detection apparatus 100 is described with a concrete example. In the following description, a probability distribution generation phase for generating appearance probability distributions in advance (operation of the learning unit 130) and a detection phase for detecting an object position from an input image (operation of the detection unit 120) are described separately.

First, the probability distribution generation phase is described.

The part area indication unit 131 determines the area of each of functional-unit part areas, such as the areas of a headlight and a tire, of an object, such as a car or a motorcycle, included in each image. In an example of a determination method to be employed, a user may indicate the areas of a headlight, a tire, and the like by operating the part area indication unit 131 in advance. Alternatively, the part area indication unit 131 may detect the areas of a headlight, a tire, and the like by use of a known detection technique to be described later, and may indicate the areas on the basis of a detection result.

Figure 5:
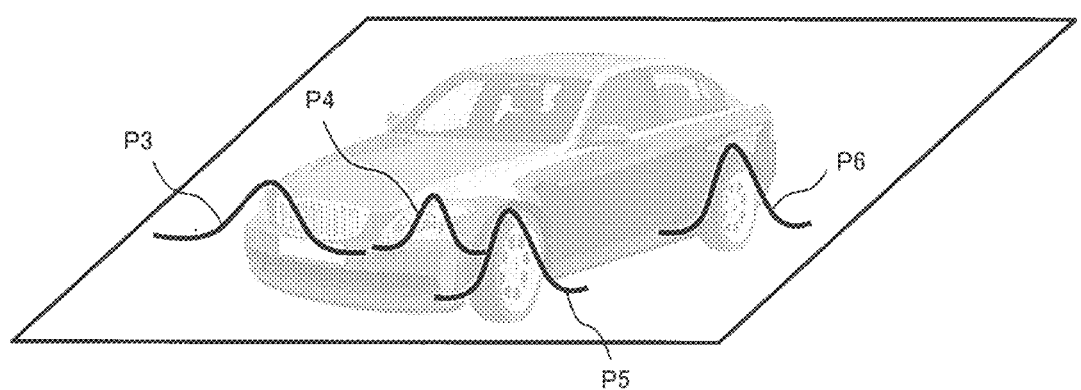
FIG. 5 is a diagram illustrating generation of appearance frequency distributions.

The indicated part areas are input to the appearance probability distribution generation unit 132. The appearance probability distribution generation unit 132 generates, for each of the indicated part areas, a histogram indicating appearance frequencies on the basis of the position and the size of the part area. For example, as illustrated in FIG. 4, the appearance probability distribution generation unit 132 calculates, for each position in images, the number of times each tire area appears, with respect to the position and the size of the tire area in Image 1 and the position and the size of the tire area in Image 2. On the basis of the calculation results, the appearance probability distribution generation unit 132 generates appearance frequency distributions P1 and P2 regarding the respective tire areas in an X-Y plane. The appearance probability distribution generation unit 132 normalizes the appearance frequency of each tire at each certain position by the total of the appearance frequencies of the tire and thereby generates the appearance frequency probability distribution of the tire. Similarly, the appearance probability distribution generation unit 132 also generates the appearance probability distributions of the other part areas, such as the headlights and the radiator grille of the car, on the basis of the group of a plurality of images. For example, FIG. 5 illustrates an example of the appearance probability distributions of headlights and tires of a car. In FIG. 5, distributions P3 and P4 represent the appearance probability distributions of the headlights of the car, and the distributions P5 and P6 represent the appearance probability distributions of the tires of the car.

Figure 6:
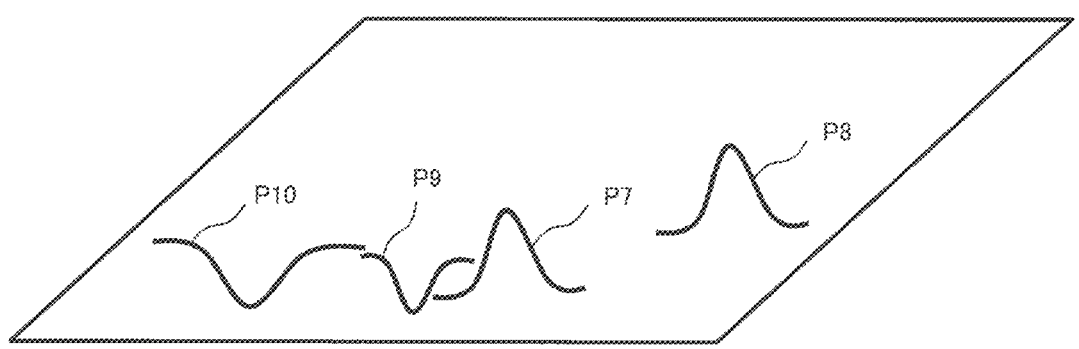
FIG. 6 is a diagram illustrating generation of absence frequency distributions.
Figure 7:
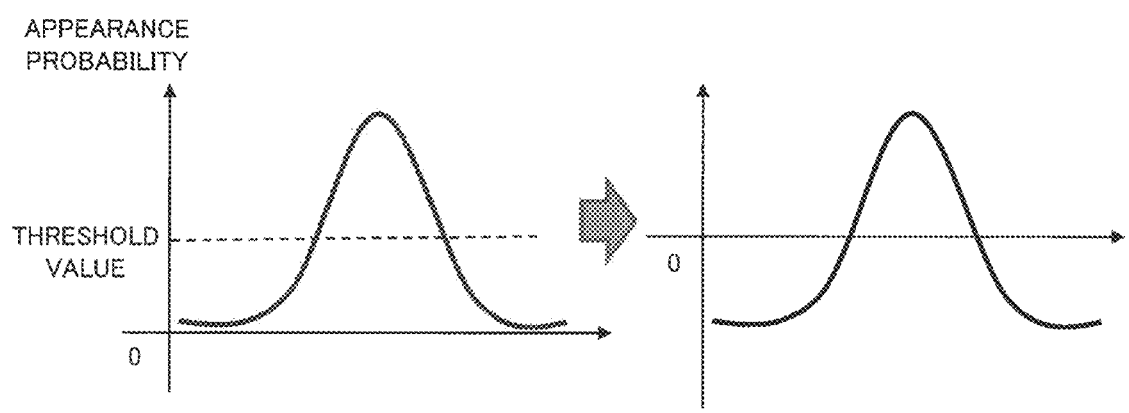
FIG. 7 is a diagram illustrating a different method for generating an appearance frequency distribution.

Subsequently, the appearance probability distribution generation unit 132 generates absence probabilities. The absence probability indicates the probability that a target part area is unlikely to appear at a certain position in the image. For example, since the tire has a low possibility of appearing in a headlight area, the appearance probability of the headlight is defined as a corresponding absence probability of a tire. Accordingly, the absence probabilities of the tire are defined as a distribution obtained by multiplying each of the appearance probabilities of the headlight by "−V". FIG. 6 illustrates an example of distributions of appearance probabilities and absence probabilities of tires. In FIG. 6, distributions P7 and P8 indicate the appearance probabilities of the tires, and distributions P9 and P10 indicate absence probabilities of the tires. As illustrated, when a tire appears at a headlight position, the appearance probabilities indicate negative values as penalty. As an alternative example of generating absence probabilities, the value obtained by converting each appearance probability that is smaller than or equal to the threshold value into a negative value may be defined as the absence probability. Specifically, as illustrated in FIG. 7, each appearance probability that is smaller than or equal to the threshold value is converted into a negative value, and the converted value may be defined as the absence probability. The generated appearance probability distributions may be stored in the appearance probability distribution storage unit 133 in the form of a file or a database.

Next, the detection phase for detecting an object in the image is described. In the following description, detection is performed by using the appearance probabilities generated in the probability distribution generation phase.

The part area detection unit 121 divides an image into partial areas and performs detection of each part area in each divided partial area. For example, assume that an input image is divided into 16 divisions in the horizontal direction and 8 divisions in the vertical direction. In this case, the part area detection unit 121 performs detection of each part area on each of the total of 16×8=128 partial areas obtained by the division. As an example of the detection method, a known detection technique may be employed. For example, the part area detection unit 121 calculates in advance a feature value for each part area by a known feature extraction method using intensity gradient, such as scale-invariant feature transform (SIFT) or histograms of oriented gradients (HOG). The part area detection unit 121 similarly calculates a feature value for each detection-target area and determines which part area has the feature value closest to the calculated feature value of the detection-target area among the feature values calculated in advance, on the basis of, for example, the distance values between the feature values.

Figure 8:
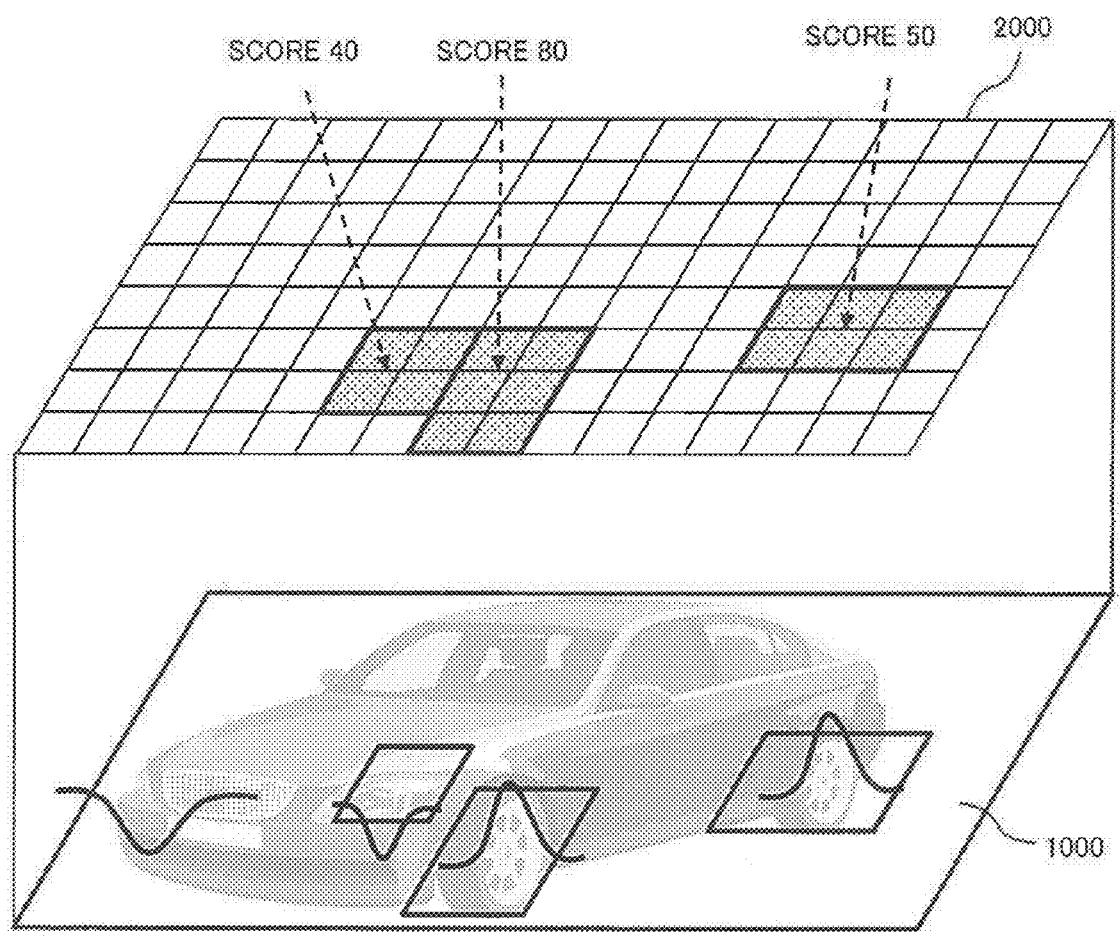
FIG. 8 is a diagram illustrating an example of a detection result of tire areas.

The part area detection unit 121 determines the part area having the feature value closest to the feature value calculated in advance as a detected part area, and represents the distance indicating how close the values are, as a score. For example, when the feature values are the same, the distance between the feather values is zero, and the part area detection unit 121 may set the score at 100. The part area detection unit 121 may also determine the area having the distance between the feature values that is smaller than a predetermined value as the detected part area. FIG. 8 is a diagram illustrating an example of results of detecting tires.

In partial areas 2000, which are obtained by dividing an input image 1000, three areas in each of which a tire is detected are presented as shaded areas. The scores of the three areas are 40, 80, and 50. The scores are retained in a score map. In this example, the area having a score of 40 is a false detection.

Figure 9:
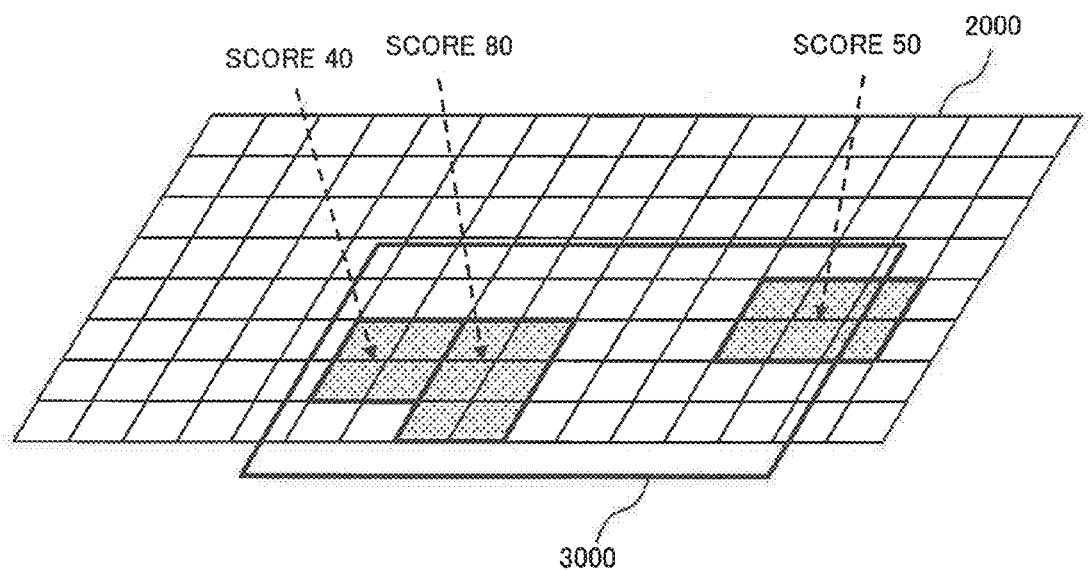
FIG. 9 is a diagram illustrating determination about an object area.
Figure 10:
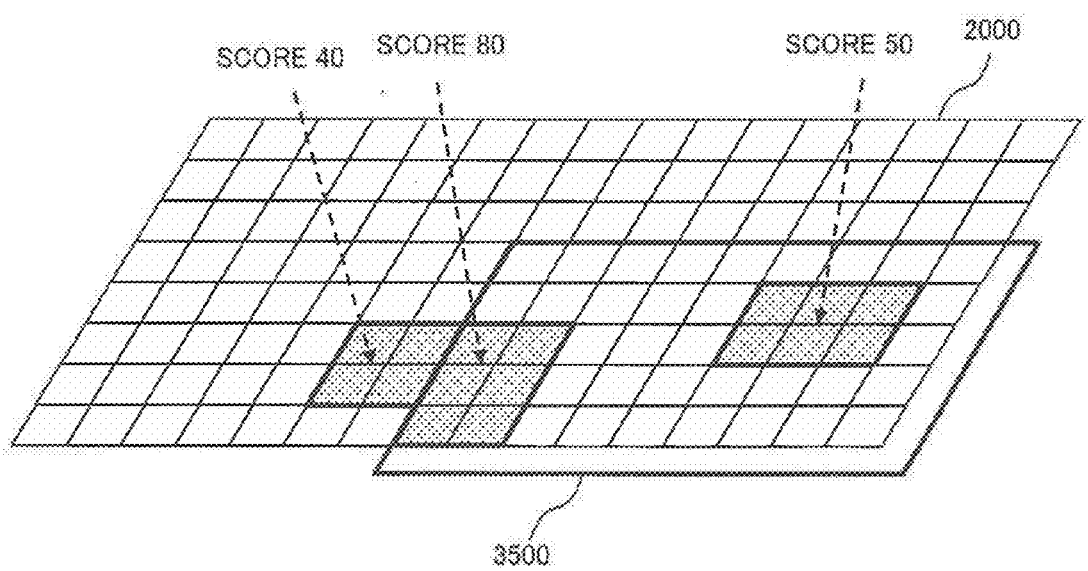
FIG. 10 is a diagram illustrating determination about an object area.

Next, the object determination unit 122 is described. The object determination unit 122 determines, for a certain area, whether the area is an object area (area including an object), based on the sum of products of the scores of respective detected part areas and the appearance probability distribution of the part areas. The sum of products serves as the evaluation value. A rectangular area 3000 illustrated in FIG. 9 is defined as the certain area. Assume, for example, that the appearance probability of the area having a score of 40 is "−0.3", which is obtained by multiplying "0.3" by "−V", the appearance probability of the area having a score of 80 is "0.8", and the appearance probability of the area having a score of 50 is "0.5". In this case, the sum of the products for the rectangular area 3000 in FIG. 9 is "40×(−0.3)+80×0.8+50×0.5=77". In contrast, the sum of the products for a rectangular area 3500 in FIG. 10 is "80×0.8+50×0.5=89". In this case, the rectangular area 3500 in FIG. 10 having the largest sum of the products is determined as a detected object area. The certain area may be defined, for example, by generating one or more patterns of a rectangular area which includes detected part areas. The area size of the certain area may be determined on the basis of the size of each part area.

An example of detecting tire areas which include a front tire and a rear tire is described in the above-described example and the part areas including such as headlights or other objects can be detected similarly. Alternatively, the object determination unit 122 may integrate detection results for respective part areas at the end and determine the integrated result as a single object area.

Advantageous effects of the object detection apparatus 100 according to this exemplary embodiment are described below. As described above, the object detection apparatus 100 generates an object appearance probability distribution based on the appearance probability distribution and the absence probability distribution of each part area. Thereby, the object detection apparatus 100 can provide penalty to each false detected part area, consequently being capable of determining an object area accurately. Hence, the object detection apparatus 100 according to this exemplary embodiment has advantageous effects that the object area can be detected more accurately by using the object appearance probability distribution taking into account the absence probability distribution.

Second Exemplary Embodiment

Next, a second exemplary embodiment based on the above-described first exemplary embodiment is described. In the following description, components similar to those in the first exemplary embodiment are denoted by the same reference signs, and the same description will not be repeated.

In this exemplary embodiment, description is given that the size of a determination area (that is, an area for which determination is made as to whether the area includes an object or not) is changed according to an increase rate of the likelihood of being the object. In object determination of this exemplary embodiment, for example, the size of the determination area is increased or decreased, and then the determination area is shifted in a direction in which the possibility of being determined that the area includes the object (object probability) increases. When the object probability is equal to or higher than a predetermined threshold value at an area where the object probability reaches a local maximum, it may be determined that the area includes the object.

An object detection apparatus 101 according to the second exemplary embodiment of the present invention is different from the configuration of the first exemplary embodiment in that the object detection apparatus 101 includes an object position search unit. Given below is the description of the object detection apparatus 101 according to this exemplary embodiment regarding the respects different from the first exemplary embodiment.

Figure 11:
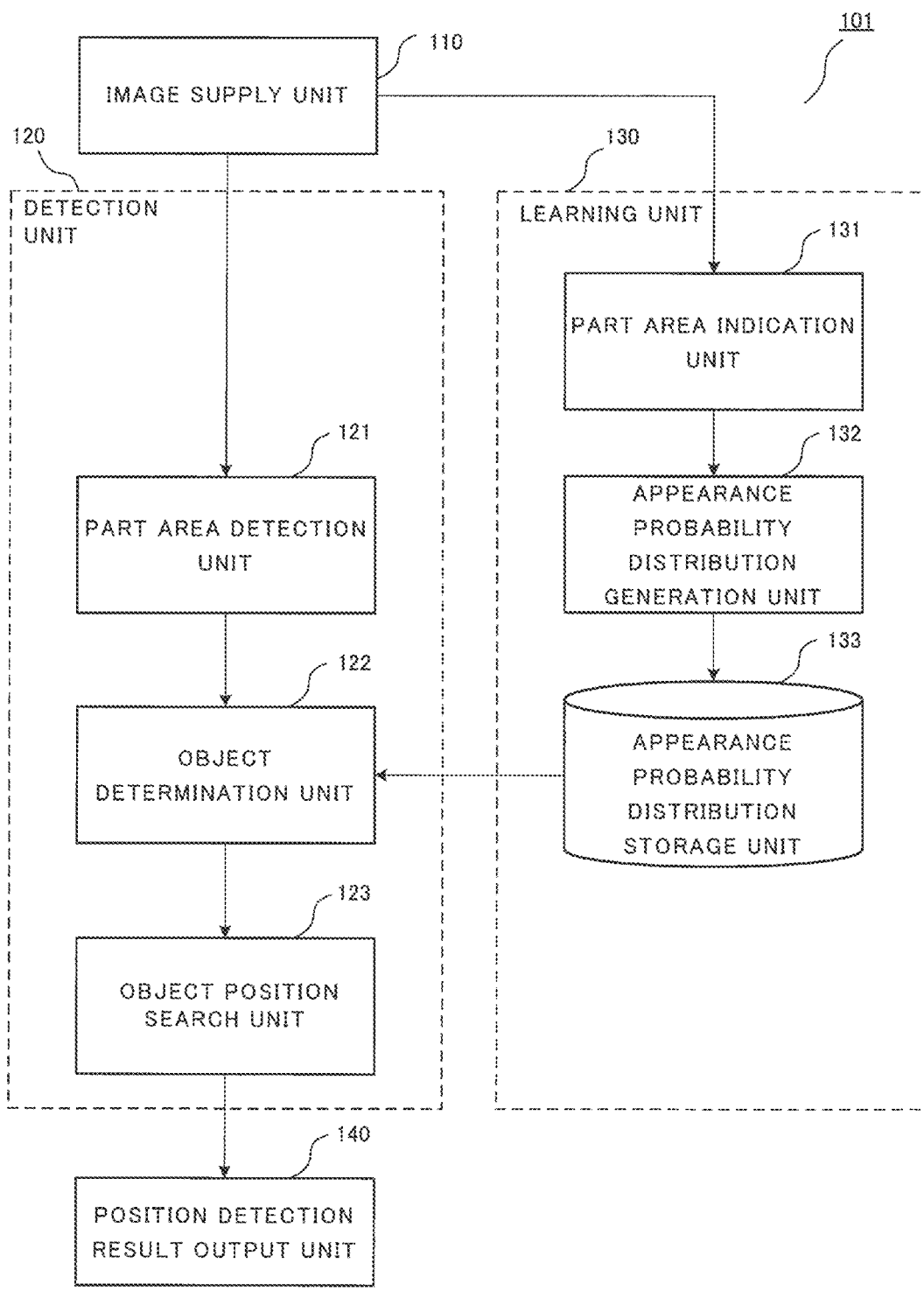
FIG. 11 is a block diagram illustrating a configuration of an object detection apparatus according to a second exemplary embodiment of the present invention.

FIG. 11 is a block diagram illustrating a configuration of the object detection apparatus 101 according to the second exemplary embodiment. The object detection apparatus 101 according to the second exemplary embodiment includes an object position search unit 123 in the detection unit 120 in addition to the components indicated in FIG. 1.

The object position search unit 123 searches for, while changing the area to perform detection of the object area, the area having the largest sum of products described in the first exemplary embodiment. In the first exemplary embodiment, it is described that the position of the detection area having the largest sum of products is detected while keeping the certain shape of the area. However, in this exemplary embodiment, the detection area is changed. For example, the object detection apparatus 101 according to the second exemplary embodiment calculates the sum of products for each of the cases of shifting the right side of the determination area for one partial area so as to expand or narrow the area. Alternatively, the object detection apparatus 101 may also calculate the sum of products for each of the cases of shifting the upper side of the determination area for one partial area so as to expand or narrow the area. Then, the object detection apparatus 101 searches for the area having the largest sum of products. In the example in the first exemplary embodiment illustrated in FIG. 9, the tire area that is supposed to be actually included in the object area may be positioned partially outside the rectangular area since the rectangular area has the fixed shape.

Figure 12:
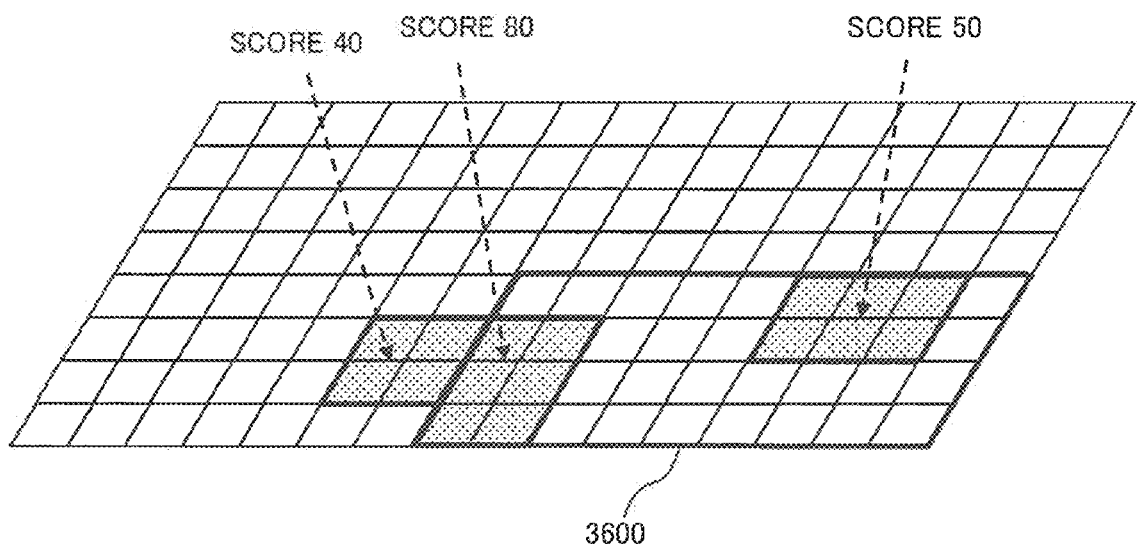
FIG. 12 is a diagram illustrating determination about an object area according to the second exemplary embodiment.

FIG. 12 is a diagram illustrating an example of a determination result of the object area performed by the object detection apparatus 101 according to the second exemplary embodiment. The object detection apparatus 101 changes a search area and thereby excludes the area outside the tire areas from the object area as illustrated in a rectangular area 3600 in FIG. 12. In the method of changing the search area to be employed, the object detection apparatus 101 may calculate the sum of products, for example, for each of the cases of expanding and narrowing the area in a certain direction and compare each of the obtained sums with the sum of products of the original area and expanding or narrowing the area in the direction of increasing or decreasing the sum of products.

As described above, according to the second exemplary embodiment, since the object position search unit 123 searches for the area of having the largest sum of products while changing the area for detecting the object area, the advantageous effect that the object area can be detected more accurately is obtained.

Third Exemplary Embodiment

Figure 13:
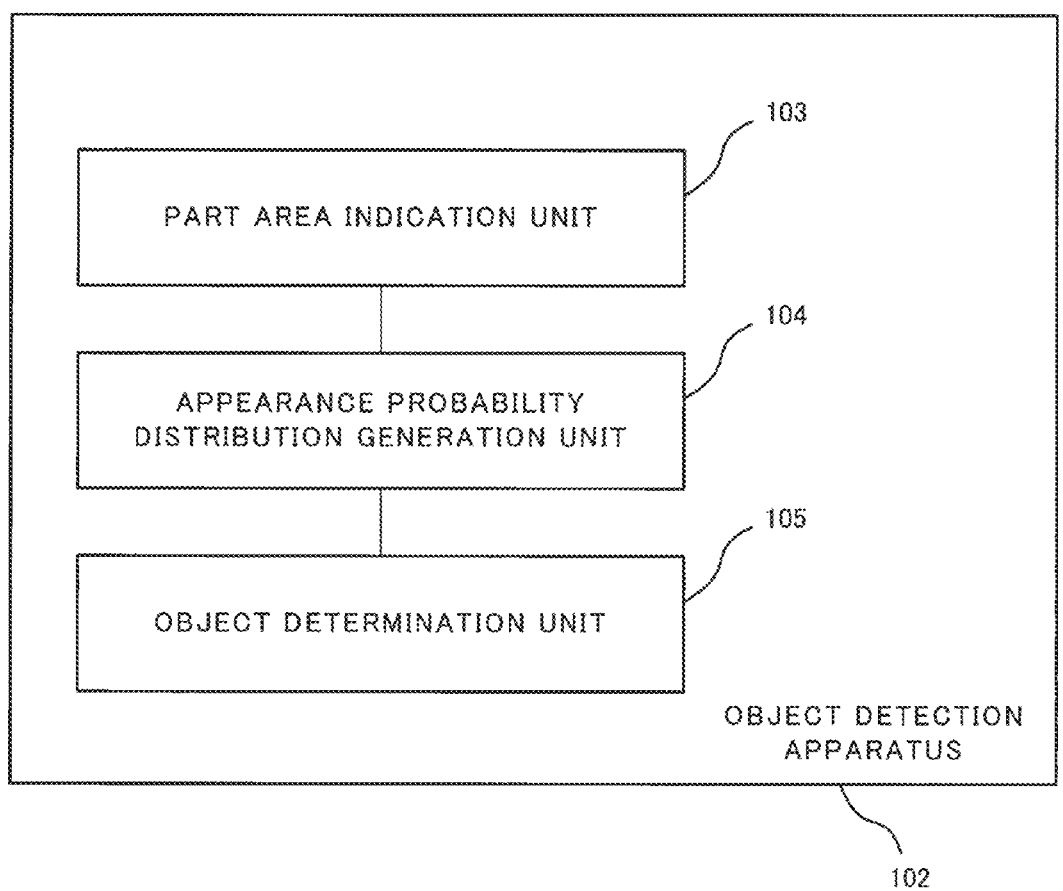
FIG. 13 is a block diagram illustrating a configuration of an object detection apparatus according to a third exemplary embodiment of the present invention.

Next, a third exemplary embodiment including the above-described exemplary embodiments is described. In FIG. 13, an object detection apparatus 102 according to a third exemplary embodiment of the present invention includes a part area indication unit 103, an appearance probability distribution generation unit 104, and an object determination unit 105.

The part area indication unit 103 indicates, from a plurality of images each including a detection-target object, a part area corresponding to an area including a target part among parts forming the object. The appearance probability distribution generation unit 104 generates the appearance probability distribution and the absence probability distribution of the part area based on the appearance frequency of the part area associated with each position in the images. The object determination hand unit 105 determines an area including the object in an input image, with reference to the appearance probability distribution and the absence probability distribution of the part area.

According to the third exemplary embodiment employing the above-described configuration, determination is made as to whether an area is the area including an object in an input image, with reference to the appearance probability distribution and the absence probability distribution of each part area. Therefore, the advantageous effect that the object area can be detected more accurately is obtained.

Figure 14:
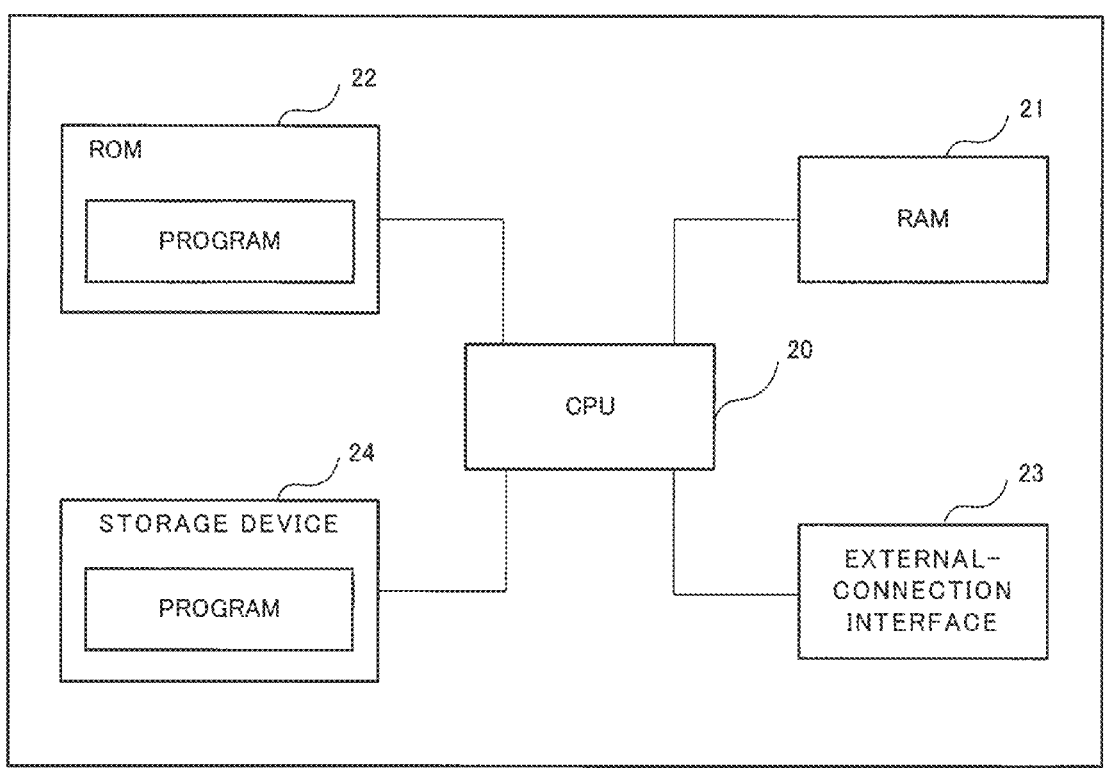
FIG. 14 is a diagram illustrating a hardware configuration implementing the object detection apparatus according to each of the exemplary embodiments of the present invention.
Figure 15:
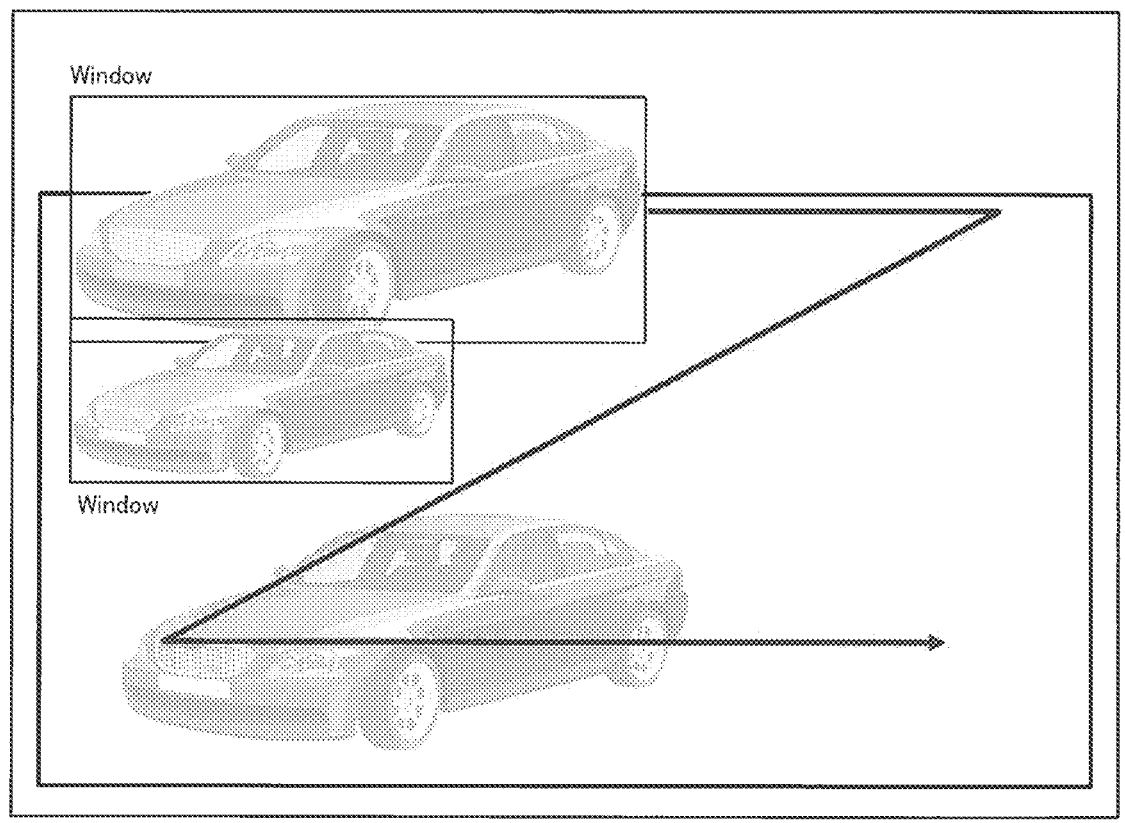
FIG. 15 is a diagram illustrating a concept of a process in the sliding window approach.
Figure 16:
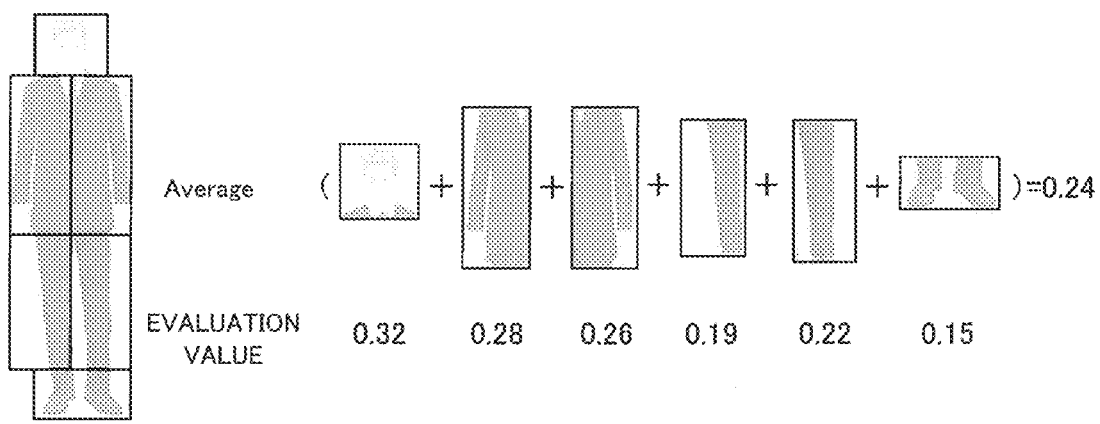
FIG. 16 is a diagram for illustrating a technique for detecting a person by use of the ensemble learning approach structured by a set of a plurality of decision trees.
Figure 17:
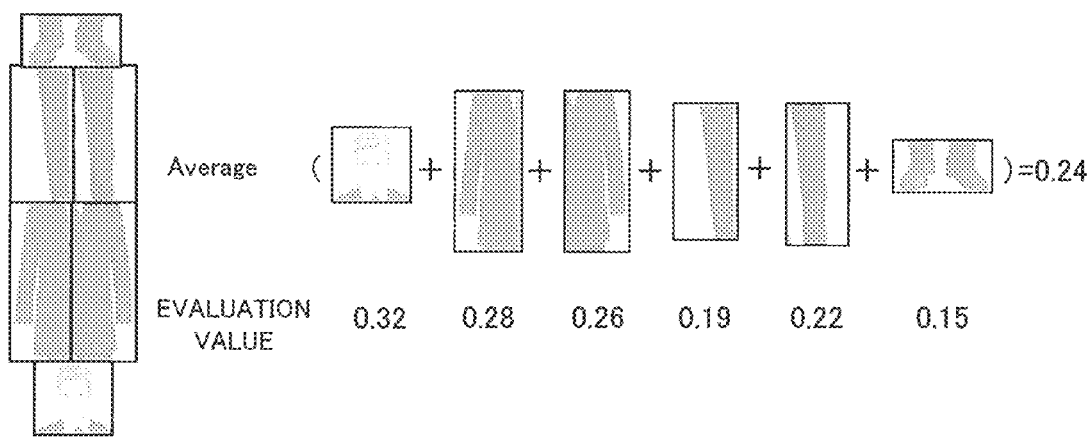
FIG. 17 is a diagram for illustrating the technique for detecting a person by use of the ensemble learning approach structured by a set of a plurality of decision trees.

The components of the object detection apparatus illustrated in any of FIG. 1 and FIG. 11 are implemented by hardware resources illustrated in FIG. 14. Specifically, the configuration illustrated in FIG. 14 includes a central processing unit (CPU) 20, a random access memory (RAM) 21, a read only memory (ROM) 22, an external-connection interface 23, and a storage device 24. The CPU 20 loads, into the RAM 21, any of various software programs (computer programs) stored in the ROM 22 or the storage device 24 and executes the program, thereby controlling the entire operation of the object detection apparatus. In other words, in each of the above-described exemplary embodiments, the CPU 20 executes the software programs implementing each of the functions (units) of the object detection apparatus, by appropriately referring to the ROM 22 or the storage device 24. Note that the hardware configuration of the object detection apparatus and the functional blocks thereof is not limited to the above-described one.

The present invention described by taking the exemplary embodiments as examples is implemented by providing, to an object detection apparatus, a computer program that can implement the above-described functions and then executing the computer program by the CPU 20.

The provided computer program may be stored in a readable/writable memory (temporary storage medium) or a computer-readable storage device, such as a hard disk device. In such a case, the present invention is understood as being configured by a storage medium storing code representing the computer program or the computer program.

The present invention is described above with the preferred exemplary embodiments. However, the present invention is not necessarily limited to the above-described exemplary embodiments, and various changes can be made for implementation within the scope of the technical spirit.

A part or the whole of the foregoing exemplary embodiment and the variations thereof may be defined as supplementary notes cited hereunder. However, the exemplary embodiment and the variations are not limited to the following supplementary notes.

(Supplementary Note 1)

An object detection apparatus including: part area indication means for indicating a part area in a plurality of images including an object to be detected, the part area being an area including a target part, the target part being one of parts forming the object to be detected;

appearance probability distribution generation means for generating an appearance probability distribution and an absence probability distribution of the part area based on an appearance frequency of the part area associated with positions of the part area in the plurality of images; and object determination means for determining an area including the object in an input image with reference to the appearance probability distribution and the absence probability distribution of the part area.

(Supplementary Note 2)

The object detection apparatus according to Supplementary Note 1, wherein the appearance probability distribution generation means generates the appearance probability distribution by generating a histogram representing an appearance frequency of the part area associated with the positions of the part area in the plurality of images.

(Supplementary Note 3)

The object detection apparatus according to Supplementary Notes 1 or 2, wherein the appearance probability distribution generation means generates, as the appearance probability distribution, a distribution having a positive value representing each appearance position and size of the part area in the images including the object.

(Supplementary Note 4)

The object detection apparatus according to any one of Supplementary Notes 1 to 3, wherein the appearance probability distribution generation means calculates an appearance frequency of an area including a part other than the target part, as an absence frequency of the part area.

(Supplementary Note 5)

The object detection apparatus according to any one of Supplementary Notes 1 to 3, wherein the appearance probability distribution generation means calculates, as the absence probability, a value obtained by multiplying an appearance probability by a negative value in a case that the appearance probability is smaller than or equal to a preset value, the appearance probability being associated with the positions of the part area in the plurality of images.

(Supplementary Note 6)

The object detection apparatus according to any one of Supplementary Notes 1 to 5, further comprising part area detection means for extracting a feature value composed of a pixel luminance change, for each partial area which is an area obtained by dividing the input image, and calculating a score value indicating a likelihood of being the part area for the partial area, based on the feature value extracted, wherein the object determination means determines an area including the object in the input image, based on a result of product-sum operation of the score calculated by the part area detection means and the appearance probability distribution of the part area generated by the appearance probability distribution generation means.

(Supplementary Note 7)

The object detection apparatus according to Supplementary Note 6, wherein the appearance probability distribution includes a distribution having a negative value representing a position and a size at which the part area is unlikely to appear in the images.

(Supplementary Note 8)

The object detection apparatus according to Supplementary Note 6 or 7, further comprising object position search means for changing a size of a determination area, which is an area for determining an area including the object in the input image, based on an increase rate regarding a likelihood of being the object.

(Supplementary Note 9)

The object detection apparatus according to any one of Supplementary Note 6 to Supplementary Note 8, wherein the object position search means increases or decreases a size of the determination area and changes the area in a direction of increasing the probability of being determined that the area includes the object, and the object determination means determines, in the area where the probability is a maximum value and the probability is larger than or equal to a threshold value, that the area includes the object.

(Supplementary Note 10)

A learning apparatus including:

part area indication means for indicating a part area in a plurality of images including an object to be detected, the part area being an area including a target part, the target part being one of parts forming the object to be detected; and appearance probability distribution generation means for generating an appearance probability distribution and an absence probability distribution of the part area based on an appearance frequency of the part area associated with positions of the part area in the plurality of images.

(Supplementary Note 11)

A method for detecting an object, including:

indicating a part area in a plurality of images including an object to be detected, the part area being an area including a target part, the target part being one of parts forming the object to be detected;

generating an appearance probability distribution and an absence probability distribution of the part area based on an appearance frequency of the part area associated with positions of the part area in the plurality of images; and determining an area including the object in an input image with reference to the appearance probability distribution and the absence probability distribution of the part area.

(Supplementary Note 12)

A program that causes a computer to execute:

a process of indicating a part area in a plurality of images including an object to be detected, the part area being an area including a target part, the target part being one of parts forming the object to be detected;

a process of generating an appearance probability distribution and an absence probability distribution of the part area based on an appearance frequency of the part area associated each positions of the part area in the plurality of images; and a process of determining an area including the object in an input image with reference to the appearance probability distribution and the absence probability distribution of the part area.

This application is based upon and claims the benefit of priority from Japanese Patent Application No. 2013-206046 filed on Oct. 1, 2013, the entire disclosure of which is incorporated herein.

INDUSTRIAL APPLICABILITY

The present invention is applicable to, for example, a computer apparatus, a mobile phone, a smart phone, and a digital still camera each of which has the function of processing the image.

REFERENCE SIGNS LIST 100, 101 OBJECT DETECTION APPARATUS
110 IMAGE SUPPLY UNIT
120 DETECTION UNIT
121 PART AREA DETECTION UNIT
122 OBJECT DETERMINATION UNIT
130 LEARNING UNIT
131 PART AREA INDICATION UNIT
132 APPEARANCE PROBABILITY DISTRIBUTION GENERATION UNIT
133 APPEARANCE PROBABILITY DISTRIBUTION STORAGE UNIT
140 POSITION DETECTION RESULT OUTPUT UNIT

What is claimed is:

1. An object detection apparatus comprising:
a memory storing instructions; and
at least one processor configured to process the instructions to:
indicate a part area in a plurality of images including an object to be detected, the part area being an area including a target part, the target part being one of parts forming the object to be detected;
generate an appearance probability distribution and an absence probability distribution of the part area based on an appearance frequency of the part area associated with positions of the part area in the plurality of images;
determine an area including the object in an input image with reference to the appearance probability distribution and the absence probability distribution of the part area; and
calculate, as an absence probability in a case that an appearance probability is smaller than or equal to a preset value, the appearance probability being associated with the positions of the part area in the plurality of images.

2. The object detection apparatus according to claim 1, wherein the processor configured to process the instructions to:
generate the appearance probability distribution by generating a histogram representing an appearance frequency of the part area associated with the positions of the part area in the plurality of images.

3. The object detection apparatus according to claim 1, wherein the processor configured to process the instructions to:
generate, as the appearance probability distribution, a distribution having a positive value representing each appearance position and size of the part area in the images including the object.

4. The object detection apparatus according to claim 1, wherein the processor configured to process the instructions to:
calculate an appearance frequency of an area including a part other than the target part, as an absence frequency of the part area.

5. The object detection apparatus according to claim 1, wherein the processor configured to process the instructions to:
extract a feature value composed of a pixel luminance change, for each partial area which is an area obtained by dividing the input image, and calculating a score value indicating a likelihood of being the part area for the partial area, based on the feature value extracted, wherein
the processor is configured to process the instructions to determine an area including the object in the input image, based on a result of sum of products operation of the score value calculated by the processor and the appearance probability distribution of the part area generated by the processor.

6. The object detection apparatus according to claim 5, wherein the appearance probability distribution includes a distribution having a negative value representing a position and a size at which the part area is unlikely to appear in the images.

7. The object detection apparatus according to claim 5, wherein the processor configured to process the instructions to:
change a size of a determination area, which is an area for determining an area including the object in the input image, based on an increase rate regarding a likelihood of being the object.

8. A learning apparatus comprising:
a memory storing instructions; and
at least one processor configured to process the instructions to:
indicate a part area in a plurality of images including an object to be detected, the part area being an area including a target part, the target part being one of parts forming the object to be detected;
generate an appearance probability distribution and an absence probability distribution of the part area based on an appearance frequency of the part area associated with positions of the part area in the plurality of images; and
calculate, as an absence probability in a case that an appearance probability is smaller than or equal to a preset value, the appearance probability being associated with the positions of the part area in the plurality of images.

9. A method for detecting an object, comprising:
indicating a part area in a plurality of images including an object to be detected, the part area being an area including a target part, the target part being one of parts forming the object to be detected;
generating an appearance probability distribution and an absence probability distribution of the part area based on an appearance frequency of the part area associated with positions of the part area in the plurality of images;
determining an area including the object in an input image with reference to the appearance probability distribution and the absence probability distribution of the part area; and calculating, as an absence probability in a case that an appearance probability is smaller than or equal to a preset value, the appearance probability being associated with the positions of the part area in the plurality of images.

10. The object detection apparatus according to claim 2, wherein the processor configured to process the instructions to:

generate, as the appearance probability distribution, a distribution having a positive value representing each appearance position and size of the part area in the images including the object.

11. The object detection apparatus according to claim 2, wherein the processor configured to process the instructions to:

calculate an appearance frequency of an area including a part other than the target part, as an absence frequency of the part area.

12. The object detection apparatus according to claim 3, wherein the processor configured to process the instructions to:

calculate an appearance frequency of an area including a part other than the target part, as an absence frequency of the part area.

13. The object detection apparatus according to claim 2, wherein the processor configured to process the instructions to:

extract a feature value composed of a pixel luminance change, for each partial area which is an area obtained by dividing the input image, and calculating a score value indicating a likelihood of being the part area for the partial area, based on the feature value extracted, wherein the processor is configured to process the instructions to determine an area including the object in the input image, based on a result of sum of products operation of the score value calculated by the processor and the appearance probability distribution of the part area generated by the processor.

14. The object detection apparatus according to claim 3, wherein the processor configured to process the instructions to:

extract a feature value composed of a pixel luminance change, for each partial area which is an area obtained by dividing the input image, and calculating a score value indicating a likelihood of being the part area for the partial area, based on the feature value extracted, wherein the processor is configured to process the instructions to determine an area including the object in the input image, based on a result of sum of products operation of the score value calculated by the processor and the appearance probability distribution of the part area generated by the processor.

15. The object detection apparatus according to claim 4, wherein the processor configured to process the instructions to:

extract a feature value composed of a pixel luminance change, for each partial area which is an area obtained by dividing the input image, and calculating a score value indicating a likelihood of being the part area for the partial area, based on the feature value extracted, wherein the processor is configured to process the instructions to determine an area including the object in the input image, based on a result of sum of products operation of the score value calculated by the processor and the appearance probability distribution of the part area generated by the processor.

16. A non-transitory computer-readable storage medium storing a program that causes a computer to execute:

a process of indicating a part area in a plurality of images including an object to be detected, the part area being an area including a target part, the target part being one of parts forming the object to be detected;

a process of generating an appearance probability distribution and an absence probability distribution of the part area based on an appearance frequency of the part area associated with positions of the part area in the plurality of images;

a process of determining an area including the object in an input image with reference to the appearance probability distribution and the absence probability distribution of the part area; and a process of calculating, as an absence probability in a case that an appearance probability is smaller than or equal to a preset value, the appearance probability being associated with the positions of the part area in the plurality of images.

* * * * *